(12) United States Patent
Giazotto

(10) Patent No.: US 7,357,357 B2
(45) Date of Patent: Apr. 15, 2008

(54) AIRCRAFT MODE SUPPRESSION

(75) Inventor: Alessandro Riccardo Britannico Giazotto, Bristol (GB)

(73) Assignee: Airbus UK Limited, Bristol (GB)

( * ) Notice: Subject to any disclaimer, the term of this patent is extended or adjusted under 35 U.S.C. 154(b) by 434 days.

(21) Appl. No.: 11/078,646

(22) Filed: Mar. 11, 2005

(65) Prior Publication Data
US 2005/0234606 A1    Oct. 20, 2005

(30) Foreign Application Priority Data
Mar. 12, 2004 (GB) ............................. 0405613.1
Sep. 23, 2004 (GB) ............................. 0421231.2

(51) Int. Cl.
*G05D 1/00* (2006.01)
(52) U.S. Cl. .................. 244/183; 244/51; 244/111
(58) Field of Classification Search ............ 244/183, 244/81, 111, 187, 110 R, 50
See application file for complete search history.

(56) References Cited

U.S. PATENT DOCUMENTS

| 4,221,350 A | * | 9/1980 | Moser et al. ............... 244/50 |
| 5,060,889 A | * | 10/1991 | Nadkarni et al. ......... 244/183 |
| 5,113,346 A | * | 5/1992 | Orgun et al. ............... 701/16 |
| 5,167,385 A | | 12/1992 | Häfner |
| 2003/0189129 A1 | | 10/2003 | Kubica |
| 2003/0205644 A1 | | 11/2003 | Najmabadi et al. |

* cited by examiner

*Primary Examiner*—Timothy D. Collins
(74) *Attorney, Agent, or Firm*—Patterson, Thuente, Skaar & Christensen, P.A.

(57) ABSTRACT

An aircraft control system operates during landing to suppress normal modes of flexing of the aircraft or modes of rigid rotation. The excitation of the modes are measured using accelerometers attached to the aircraft or strain-measuring devices attached to the landing gears. To suppress the modes, the controller operates the flight control surfaces, e.g., elevators, ailerons, rudders and spoilers and/or the steering angle of the nose wheel. This reduces vibration, which reduces wear and makes braking more even because the variation in load on the ground wheels caused by the excitation of the modes is reduced.

20 Claims, 8 Drawing Sheets

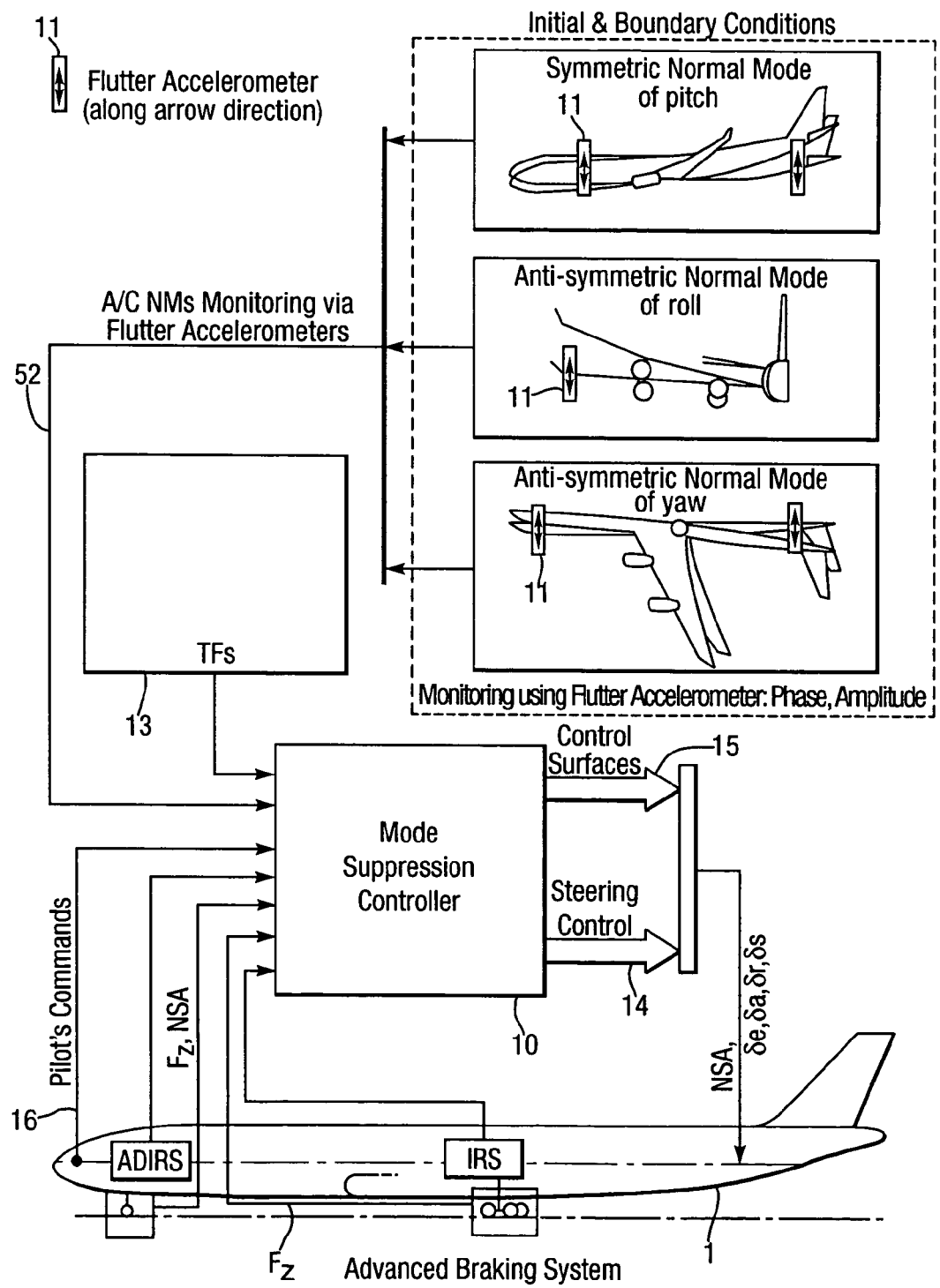

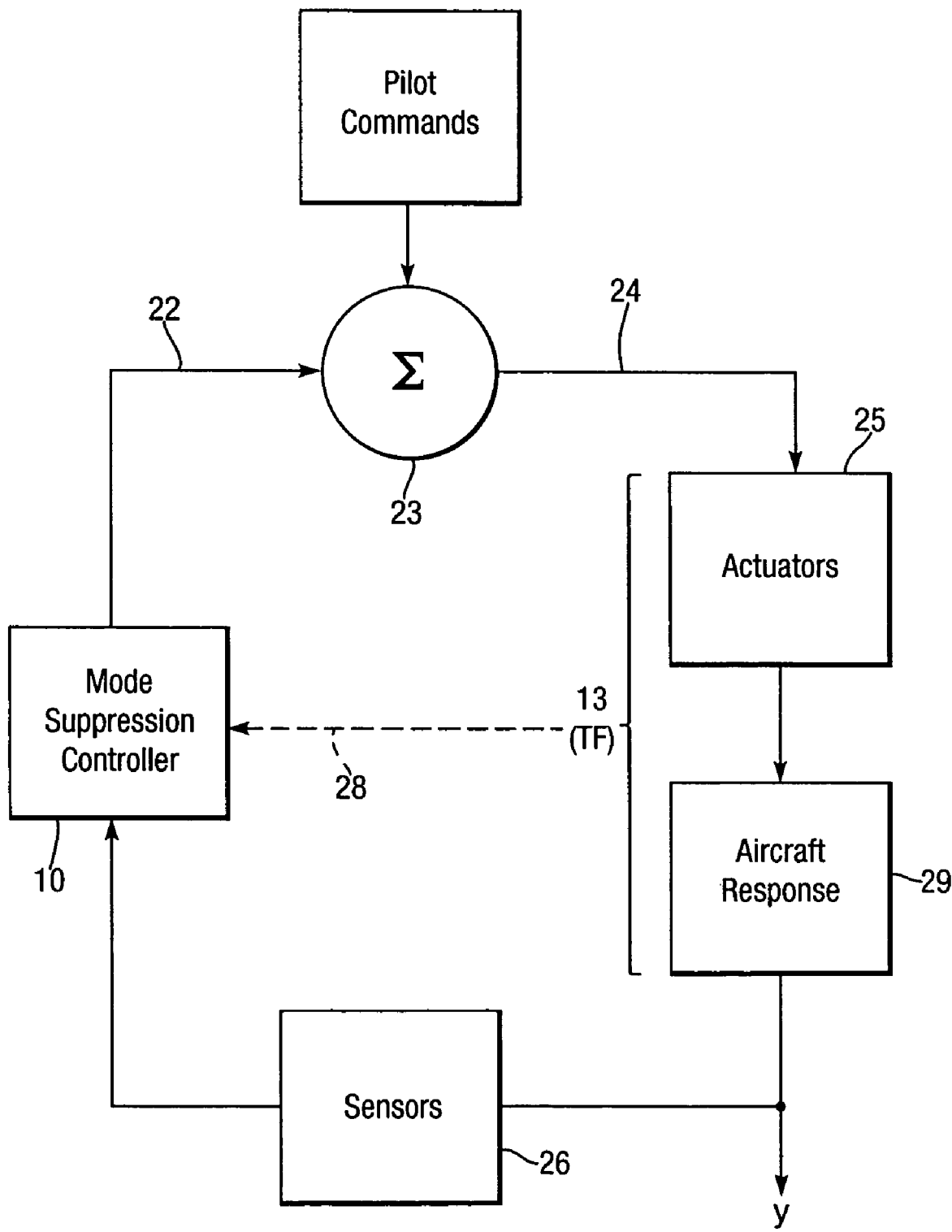

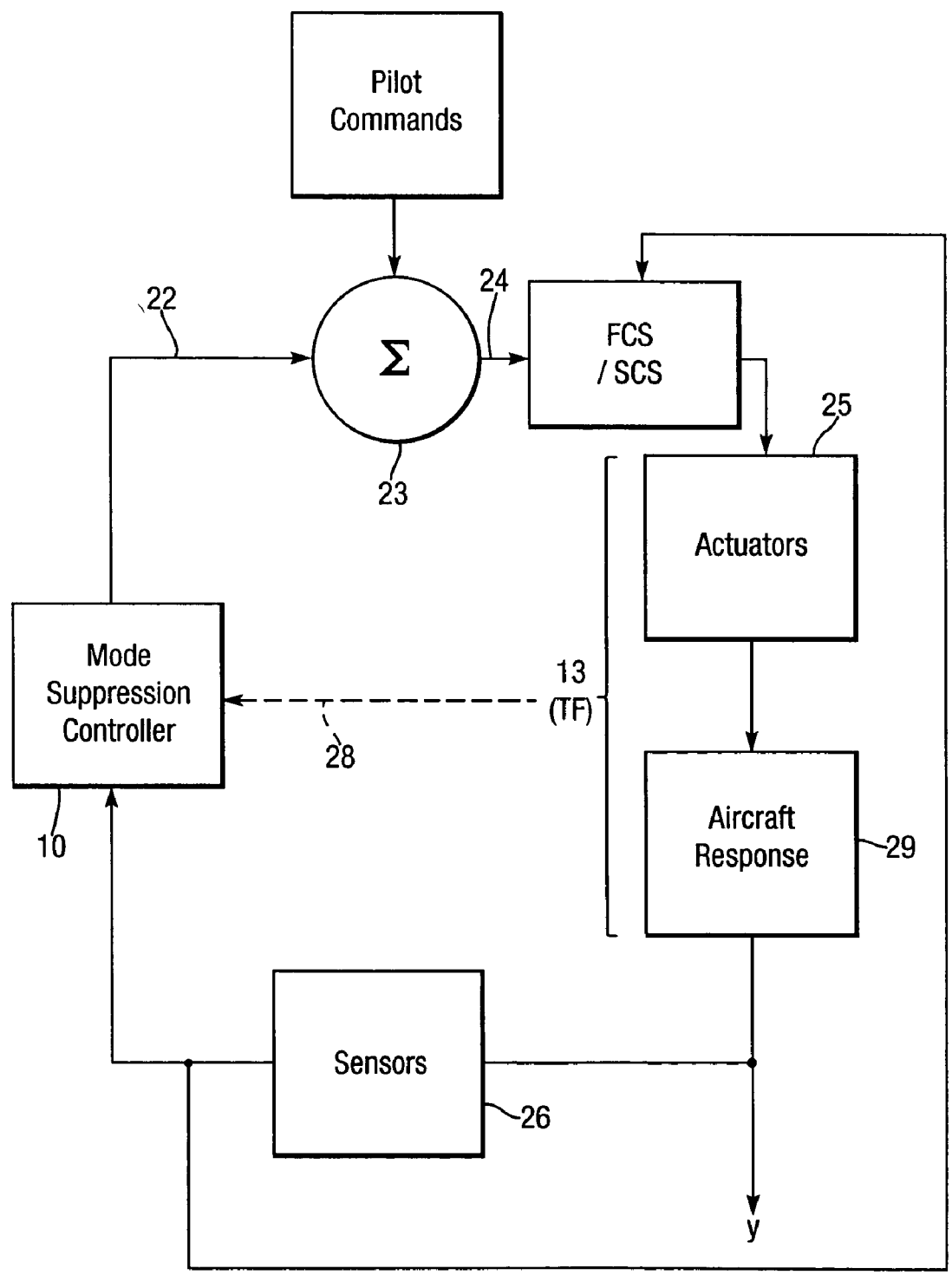

MODESHAPE NORMALISED TO WINGLET

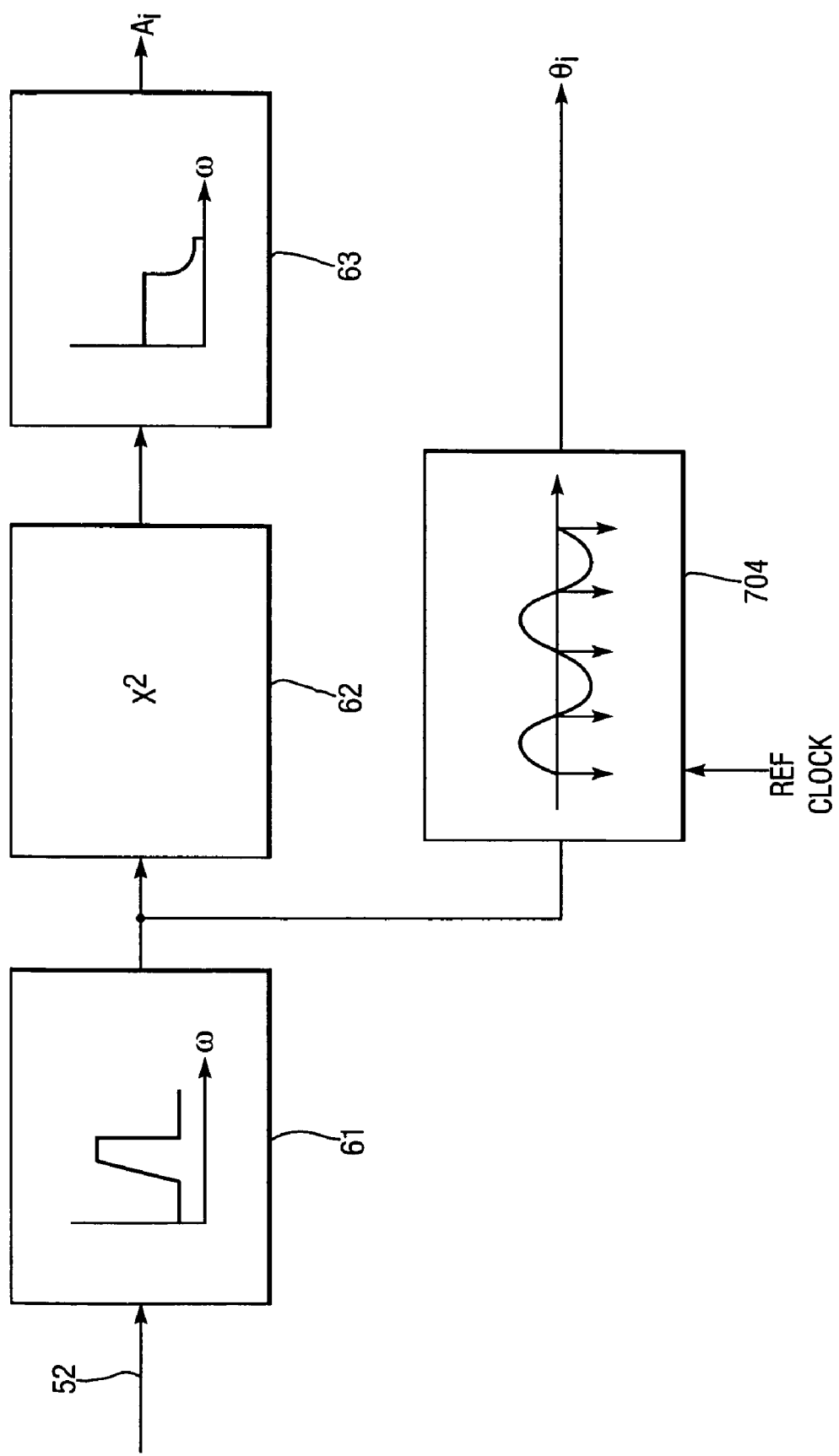

AIRCRAFT MODE SUPPRESSION

BACKGROUND OF THE INVENTION

The present invention relates to the suppression of modes of an aircraft on the ground.

Uneven deceleration of an aircraft during braking on landing is a problem. In particular the inventor has realised that it can cause the modes of the structure of the aircraft to be excited. These modes include both the normal modes of the aircraft structure, which flex the structure, and oscillations in the attitude of the aircraft, i.e. modes of rigid rotation of the aircraft. The flexing of the aircraft structures caused by the normal modes may cause undesirable fatigue damage. Excitation of the modes may also cause an uncomfortable ride for the passengers.

There are several sources of the uneven deceleration.

One source is the braking provided by the wheel brakes of the landing gears. The braking force provided by a ground wheel is equal to $\mu F_z$ where $\mu$ is the coefficient of friction between the tyre and the ground and $F_z$ is the vertical load on the wheel. So, variation in the vertical load on a wheel leads to variation in the braking force. This variation in braking force in turn excites the modes (rigid rotational and normal modes) of the aircraft, to which, of course, the wheels providing the braking are attached. In turn the motion of the aircraft due to these excited modes affects the vertical load on the wheels, which can further excite the modes, and so on.

Also, the coefficient of friction can vary along a runway, and from runway to runway and from time to time, e.g. by being wet or dry. This therefore varies the braking force, again exciting the aircraft modes.

Another factor is that known braking systems often oscillate between a stable and an unstable behaviour, called skidding and releasing the brakes: when the wheels start to skid, the brake control system then prevents the skid. As the demand for braking is of course high skids soon reoccur. This switching back and forth changes the attitude of the aircraft and thus it is another cause of excitation of the modes of the aircraft.

The present invention seeks to suppress these aircraft modes and thereby alleviate the problems caused such as fatigue and uneven braking.

SUMMARY OF THE INVENTION

According to a first aspect of the present invention there is provided an aircraft control system comprising:

one or more sensors responsive to one or more of the modes of the aircraft, and a controller responsive to the one or more sensors to provide, during braking of the aircraft on the ground, one or more control signals for one or more of the control surfaces of the aircraft, or for the steering angle of a ground wheel of the aircraft, the control signals provided by the controller being such that they reduce the excitation of the said one or more of the modes of the aircraft, and/or reduce the variation in vertical load on the ground wheels of the aircraft caused by excitation of the said one or more modes of the aircraft.

In one arrangement, the or a mode controlled by the controller is a normal mode of flexing of the aircraft.

Preferably, the normal mode controlled is a mode in which the fuselage undergoes lateral bending when viewed from above, called herein a 'shimmy mode'.

The or a mode controlled by the controller may be a symmetric normal mode of pitch.

Additionally or alternatively, the or a mode controlled by the controller may be an anti-symmetric normal mode of roll.

Additionally or alternatively, the or a mode controlled by the controller may be the an anti-symmetric normal mode of yaw.

In another arrangement, the or a mode controlled by the controller is an oscillatory mode of rigid rotation of the aircraft.

In one arrangement, the one or more sensors is, or includes, an accelerometer.

In an alternative arrangement, the accelerometer is a flutter accelerometer.

Preferably, the flutter accelerometer is tuned to a mode of the aircraft that is controlled by the controller.

In another arrangement, the one or more sensors is, or includes, a strain-measuring device mounted on the aircraft so as to measure the vertical load on a landing gear or landing wheel.

In another arrangement, the one or more sensors is, or includes, the air data inertial reference system (ADIRS) or the inertial reference system (IRS).

In another arrangement the sensors of the braking system of the leading gear provide a measure of the vertical load on the landing gear.

In one embodiment controller comprises a filter connected to filter the signals from and to provide those as the control signals. The response function of the filter may be dependent on one or more of the following: the mass of the aircraft, the distribution of the mass of the aircraft, the airspeed of the aircraft, the ground speed of the aircraft, the position of one or more of the flight control surfaces.

In another embodiment, the aircraft control system comprises, in respect of a mode that the controller controls, a filter connected to be responsive to signals from a said sensor that senses that mode, to pick out from those signals the signal at the frequency produced by the sensor in response to that mode.

The controller may be arranged to determine, in response to the signals from the one or more sensors the amplitude and phase of a said mode, and in response to that amplitude and phase to generate the or a said control signal.

The invention also provides a method of controlling an aircraft on landing, after touchdown, comprising:

measuring the excitation of one or more of the modes of the aircraft, and generating control signals for one or more of the control surfaces of the aircraft, or for the steering angle of a wheel of the aircraft, in response to those measurements, and applying those control signals to the control surfaces, or the steering of the nose wheel, the control signals being such that they reduce the excitation of the said one or more of the modes of the aircraft, and/or reduce the variation in vertical load on the ground wheels of the aircraft caused by excitation of the said one or more modes of the aircraft.

The or a mode reduced by the control signals may be a normal mode of flexing of the aircraft.

Alternatively or additionally, the normal mode of flexing reduced may be a shimmy mode in which the fuselage undergoes lateral bending when viewed from above.

Alternatively or additionally, the or a mode reduced by the control signals is a symmetric normal mode of pitch.

Alternatively or additionally, the or a mode reduced by the control signals may be an anti-symmetric normal mode of roll.

Alternatively or additionally, the or a mode reduced by the control signals may be an anti-symmetric normal mode of yaw.

Alternatively or additionally, the or a mode reduced by the control signals may be an oscillatory mode of rigid rotation of the aircraft.

In one arrangement, the excitation of the mode or modes is measured by an accelerometer.

In another arrangement, the accelerometer is a flutter accelerometer.

Preferably, the flutter accelerometer is tuned to a mode of the aircraft that is reduced by the control signals.

In one arrangement, the excitation of the mode or modes is measured by measuring the vertical load on a landing gear or landing wheel. This may be measured with a strain measuring device or be derived from the output of sensors of the braking system.

In another arrangement the excitation of the mode or modes is measured by the air data inertial reference system (ADIRS) or the inertial reference system (IRS).

In another arrangement, the measuring of the excitation of the said mode or modes comprises, sensing the excitation of the mode or modes and with a sensor, and filtering the output of the sensor to pick out the signal at the frequency produced by the sensor in response to that mode or a particular one of the modes.

In one embodiment the generating control signals for the one or more of the control surfaces of the aircraft, or for the steering angle of a ground wheel of the aircraft, in response to the measurements, comprises filtering those measurements and providing the filtered measurements as the control signals.

In another embodiment, the measuring of the excitation of the mode or modes comprises the determining of the amplitude and phase of the mode or modes, and the generating of control signals is in response to that amplitude and phase. The generating of control signals may comprise generating one or more oscillatory control signals in response to the measured one or more amplitude and phase.

The present invention also provides an aircraft control system comprising:

one or more sensors responsive to one or more of the modes of the aircraft, and a filter connected to filter signals from the sensors and to provide resultant signals as control signals for one or more of the control surfaces of the aircraft, or for the steering angle of a ground wheel of the aircraft, the control signals being operative during braking of the aircraft on the ground such that they reduce the excitation of said one or more of the modes of the aircraft, and/or reduce the variation in vertical load on the ground wheels of the aircraft caused by excitation of the said one or more modes of the aircraft.

The present invention further provides aircraft control system comprising:

one or more sensors respectively responsive to modes of the aircraft to provide respective output signals, and an amplitude and phase determiner connected to receive the output signals from the sensors and to provide respective amplitude and phase measurements of those, for each said sensed mode, an oscillator for each of one or more control surfaces of the aircraft or for the steering angle of a ground wheel of the aircraft, each oscillator having an output for a control signal for a controlling its control surface or steering angle and having controllable amplitude and phase for that output, a lookup table connected to convert the amplitude and phases measured by the determiner to amplitude and phases outputs connected to control the amplitudes and phase of the oscillators, the control signals being operative during braking of the aircraft on the ground such that they reduce the excitation of the said one or more of the modes of the aircraft, and/or reduce the variation in vertical load on the ground wheels of the aircraft caused by excitation of the said one or more modes of the aircraft.

The present invention also provides an aircraft comprising:

control surfaces and ground wheels, one or more sensors responsive to one or more of the modes of the aircraft, and a controller responsive to the one or more sensors to provide, during braking of the aircraft on the ground, one or more control signals for one or more of the control surfaces of the aircraft, or for the steering angle of a ground wheel of the aircraft, the control signals provided by the controller being such that they reduce the excitation of the said one or more of the modes of the aircraft, and/or reduce the variation in vertical load on the ground wheels of the aircraft caused by excitation of the said one or more modes of the aircraft.

DESCRIPTION OF THE FIGURES

Examples of the invention will now be described, with reference to the accompanying Figures, of which:

FIG. 1 is an overall block diagram of the control system of the present invention.

FIG. 2 shows the feedback control loop of the control system.

FIG. 2*a* shows the control loop of FIG. 2 with an inner control loop of the FCS and SCS.

FIG. 6 shows an exemplary circuit for determining the amplitude and phase of a sinusoidal signal.

FIG. 1 is an overall block diagram of the control system used in the examples of the invention.

DESCRIPTION OF THE PREFERRED EMBODIMENTS

Figure 2B:
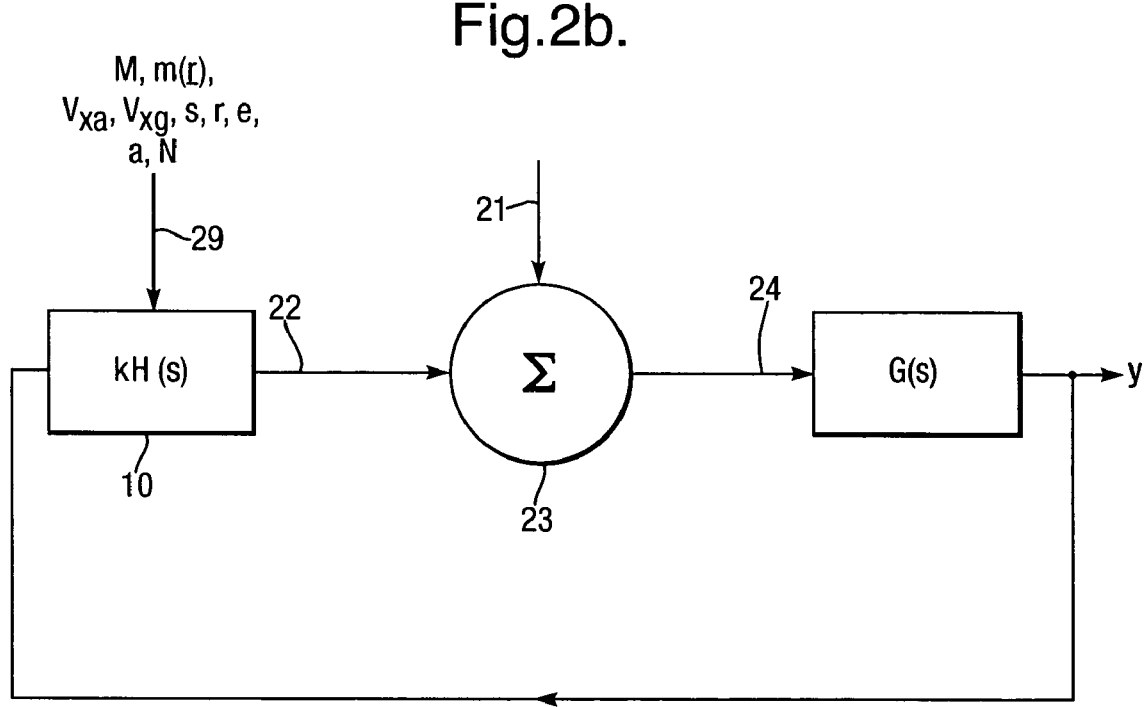
FIG. 2*b* is a block diagram showing the transfer functions of the control system of FIG. 2.

The inputs to the mode suppression controller 10 shown include:

The vertical load $F_z$ on each of the landing wheels (or alternatively on each landing gear). These are measured, for example, using strain gauges on the supporting spars of the landing gear.

Flutter accelerometers. These are tuned and orientated to respond to oscillations of the principal normal modes of the airframe or of the rigid rotational modes of the aircraft and so provide to the controller 10 separate measures of the amplitude and phase of each of the principal modes. Suitable tuned accelerometers or alternatively gyrometers are available. The accelerometers shown in FIG. 1 are only an example; their position, type and number will vary from aircraft to aircraft.

Additionally or alternatively data on the excitation of the modes can be derived from the air data inertial reference system (ADIRS) or the inertial reference system (IRS).

Also shown as an input in FIG. 1 are various transfer functions 13 (TF) for the aircraft 1 relating the response of the aircraft to the outputs of the controller, in particular, in response to actuation of the aerodynamic control surfaces and the steering angle of the nose wheel. The response of the aircraft is sensed, for example, through the flutter accelerometers or through the vertical loads on the landing gear or using the ADIRS or IRS. As is explained later, in some examples, these are predetermined and are embodied in the logic of the controller 10, aiding it to determine its outputs. Also as is explained below these transfer functions may be determined for a range of different masses of the aircraft, and its distribution, which of course vary with payload and fuel (the initial fuelling being determined by the range for the flight).

The outputs of the controller 10 shown include:

A command 14 for the nose steering angle (NSA)

Commands 15 for each of the control surfaces of the aircraft (elevators, ailerons, rudder and spoilers; marked as δe, δa, δr, δs respectively).

Existing aircraft have, of course, a flight control system (FCS) and a steering control system (SCS) which, in response to the pilots' commands, respectively provide commands for actuation of the control surfaces and steering of the landing wheels (usually the nose wheel). The new control functions of the present invention could be incorporated into a single central control system providing all of those systems. The present invention would not necessarily be implemented in this way.

The present invention is preferably implemented by adding the commands provided by the mode suppression controller to the pilot's commands. This allows the pilot to remain in control of the control surfaces and the steering, if necessary. FIG. 2 shows this arrangement.

FIG. 2 shows the control feedback loop. The pilot's commands 21 for the flight control surfaces and nose steering angle are added to those 22 from the controller 10 of the present invention by adder 23. The resultant 24 is applied to actuators 25 for the control surfaces and the nose wheel, which respond to those commands and the aircraft 1, as a whole, responds to the additional loads caused by that. This physical response of the aircraft is labelled y in the Figure. Sensors 26 (for example, accelerometers 11 or landing gear vertical load sensors as mentioned above) measure that response y and the controller takes action to suppress any excitation of the modes of the aircraft that are present in the response y. Again as mentioned above, knowledge of the transfer functions 13 (TF) of the aircraft is present in the controller 10, which is indicated by the dotted line 28.

The FCS and SCS are not shown as such in FIG. 2. The known forms of control (of the flight control surfaces and ground wheel steering) that they provide can either be incorporated in an overall controller, their functions being incorporated with that of the mode suppression controller 10, or (as shown in FIG. 2a) as an inner feedback loop taking the resultant command 24, from the adder 23, as a command input and the outputs of the sensors 26 as feedback.

The inventor has studied the modes of the airframe of a recent Airbus aircraft in ground configuration using finite element analysis and flight test data. The main modes excited on landing and during braking were:

a SYMMETRIC NORMAL MODE OF PITCH an ANTI-SYMMETRIC NORMAL MODE OF ROLL an ANTI-SYMMETRIC NORMAL MODE OF YAW in particular they were among the lower frequency ones of each of these kinds.

These modes are normal modes of flexing of the aircraft. Since these three modes account for most of the excitation in the modes of the aircraft, it is these modes that are controlled in the examples given below. It is however in accordance with the invention to control any number of modes. Also observed in addition to these normal modes were aerodynamically related rigid body motions of the aircraft. These were of lower frequency than the normal modes of flexing but were not of such significant amplitude, and although it would have been possible to control them with the invention, in this example it was decided not to for the reasons given later below.

It is possible that for other designs of aircraft that other ones of the modes (whether they be normal modes of flexing or aerodynamic rigid body oscillations) will be the most prevalent, and in such a case it is those modes should preferably be controlled.

Aircraft rigid body modes, although they do not flex the aircraft directly, do affect its attitude and so therefore can change the vertical loads on the wheels affecting the braking, which is undesirable in itself. Further variation in braking can, in turn, excite the normal modes. Thus it is useful to control the rotational modes to reduce their effects on braking, and to reduce excitement of the normal modes.

Figure 3:
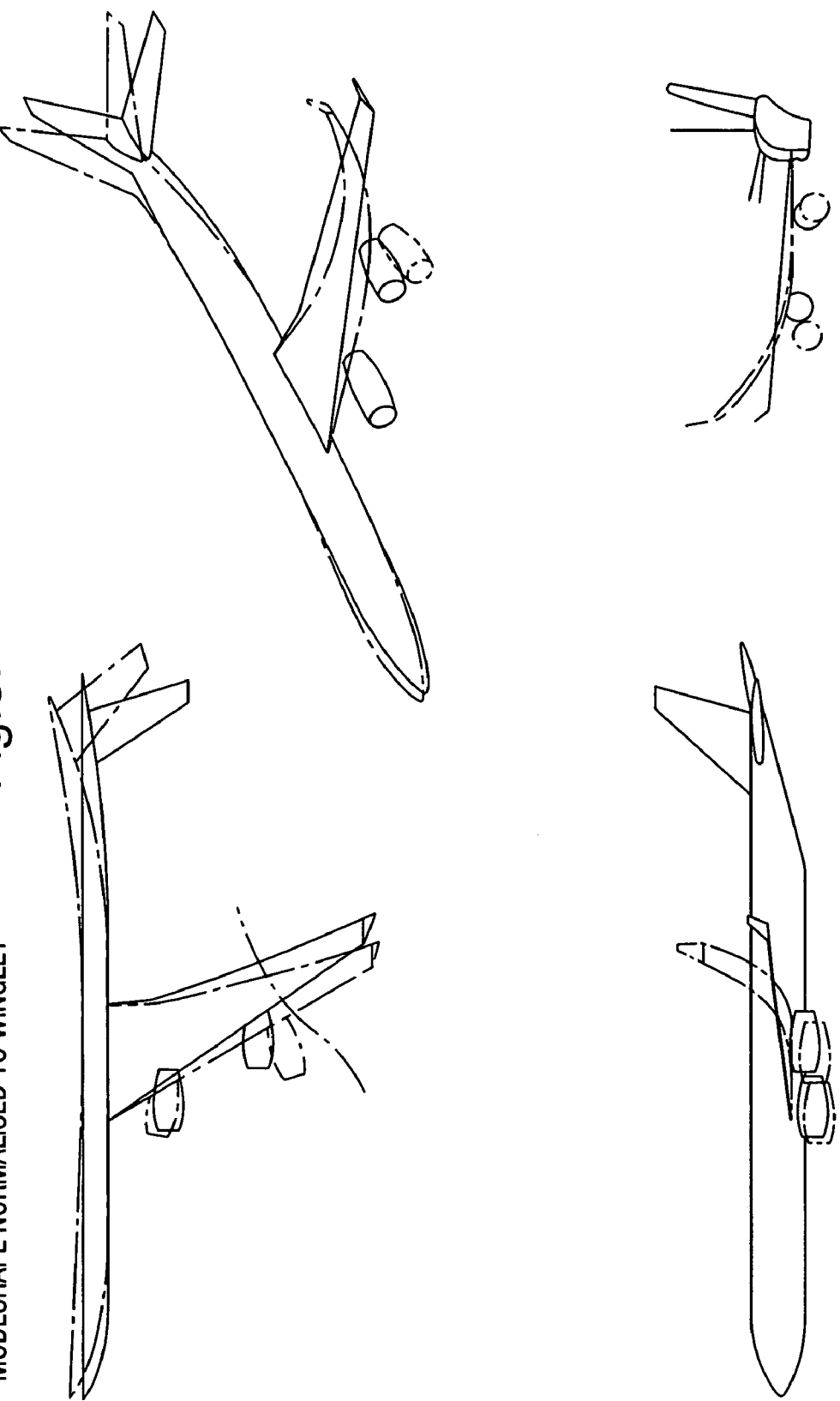
FIG. 3 is a diagram showing the flexing of an airframe in a shimmy mode.
Figure 4:
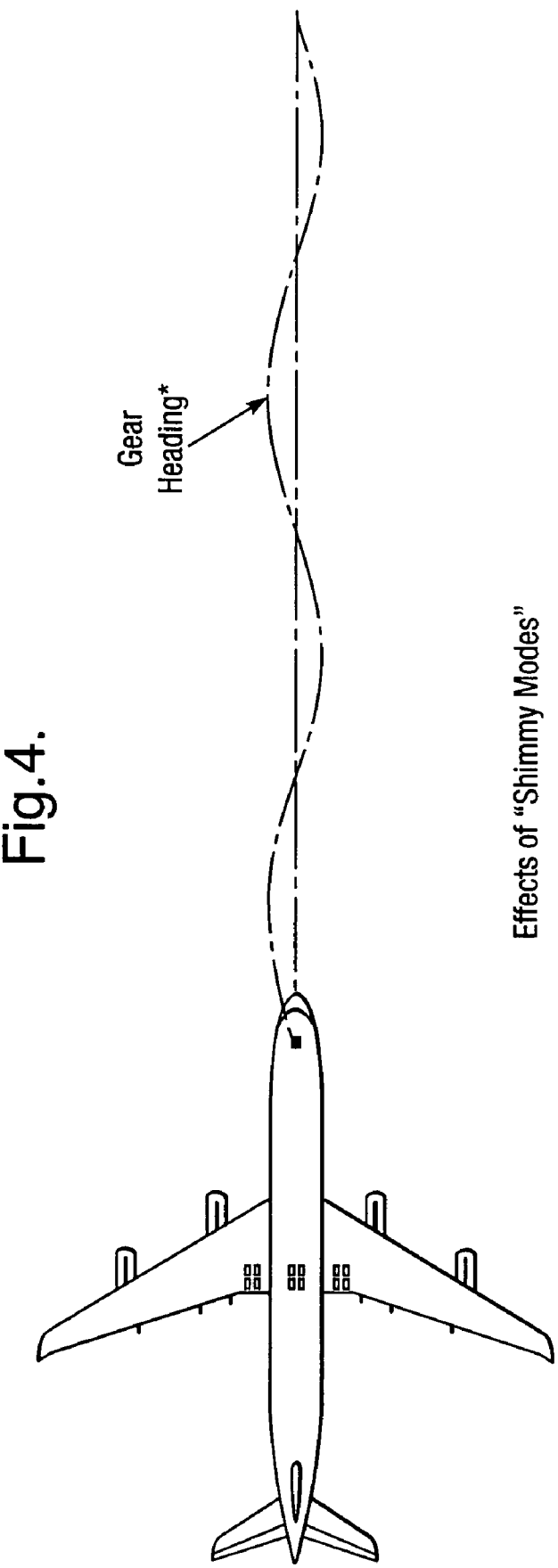
FIG. 4 illustrates the steering problem caused by the shimmy modes.

Some of the normal modes of flexing cause lateral bending of the fuselage of aircraft (herein called "shimmy modes"). One such mode is illustrated in FIG. 3, which shows the distortions of the aircraft using a wire-frame model. As may be seen from a plan view (e.g. top left diagram of FIG. 3) such bending changes the direction in which the nose wheel is pointing (since the nose portion of the fuselage, to which it is fixed, is no longer aligned along the axis of the aircraft). Such modes therefore cause sinusoidal variation of the direction of the nose landing gear, causing the aircraft to travel along a generally sinusoidal track (see FIG. 4) and causing further excitation of aircraft modes. The examples of the invention given below seek to suppress shimmy-modes also.

As mentioned above, on landing, an aircraft also undergoes two aerodynamically related oscillatory modes of rigid rotation of the whole aircraft, called herein the "Ground Dutch Roll Mode" (a periodic yaw and roll coupled motion) and the "Ground Short Period Mode" (a periodic pitch motion). Although these rotational modes could be actively controlled by the present invention, they are not actively controlled in the examples given below because they appear not to affect the braking dynamics severely, owing to their slow dynamics and because they are more damped than the internal normal modes of the airframe.

In summary, the approach of the invention is to measure the oscillations of the aircraft and to control the flight control surfaces and the nose steering angle to suppress those oscillations.

FIG. 2b shows a block diagram of the control loop of which the mode suppression controller of the invention forms a part. In the diagram G(s) represents the transfer functions of the system aircraft (to be controlled). kH(s)

represents the transfer functions (or filter functions) of the controller of the motions of the aircraft (as fed back to it via the sensors).

In one example of the invention, the controller 10 is implemented as a filter having the transfer function kH(s). As will be apparent, generally in the invention, the control loop is multivariable—i.e. there is more than one sensor signal taken into account and multiple control signals are generated. Table 1 below (given in the description of a second example below) lists which flight control surfaces are preferably to be employed to suppress which kinds of mode. Also in the description of the second example below it is described how the transfer functions of the aircraft G(s) may be found through finite element analysis and experiment. Both of these apply to the design of such a filter.

The design of filters and filter functions is a well known problem in signal processing. The skilled person will therefore be able to provide a suitable filter function kH(s) to damp the oscillations of the aircraft during braking. The filter design process takes into account the aircraft response function G(s) in that it will respond significantly to the frequencies of the target modes to be controlled and will feedback those frequencies with phases suitable to suppress those modes (rather than enhance them). As will be known to the person skilled in the art, such filter design methods employ an analysis of the poles and zeros in the complex plane of the response transfer function of the controlled system (in this case the aircraft).

Typically, the filter operates on the signals from sensors directly. These signals may be, for example, acceleration or displacement of the relevant parts of the aircraft depending on the type of sensor employed (for example flutter accelerometers, strain gauges in the landing gear supports or data from the ADIRS or the IRS).

In the second example of a controller, the signals from the sensors are reduced first to amplitudes and phases of the normal modes before they are transformed, or filtered, by the controller 10. The transformed amplitudes and phases are then turned back into oscillatory signals before application to the flight control surfaces and the nose wheel using oscillators.

Figure 5:
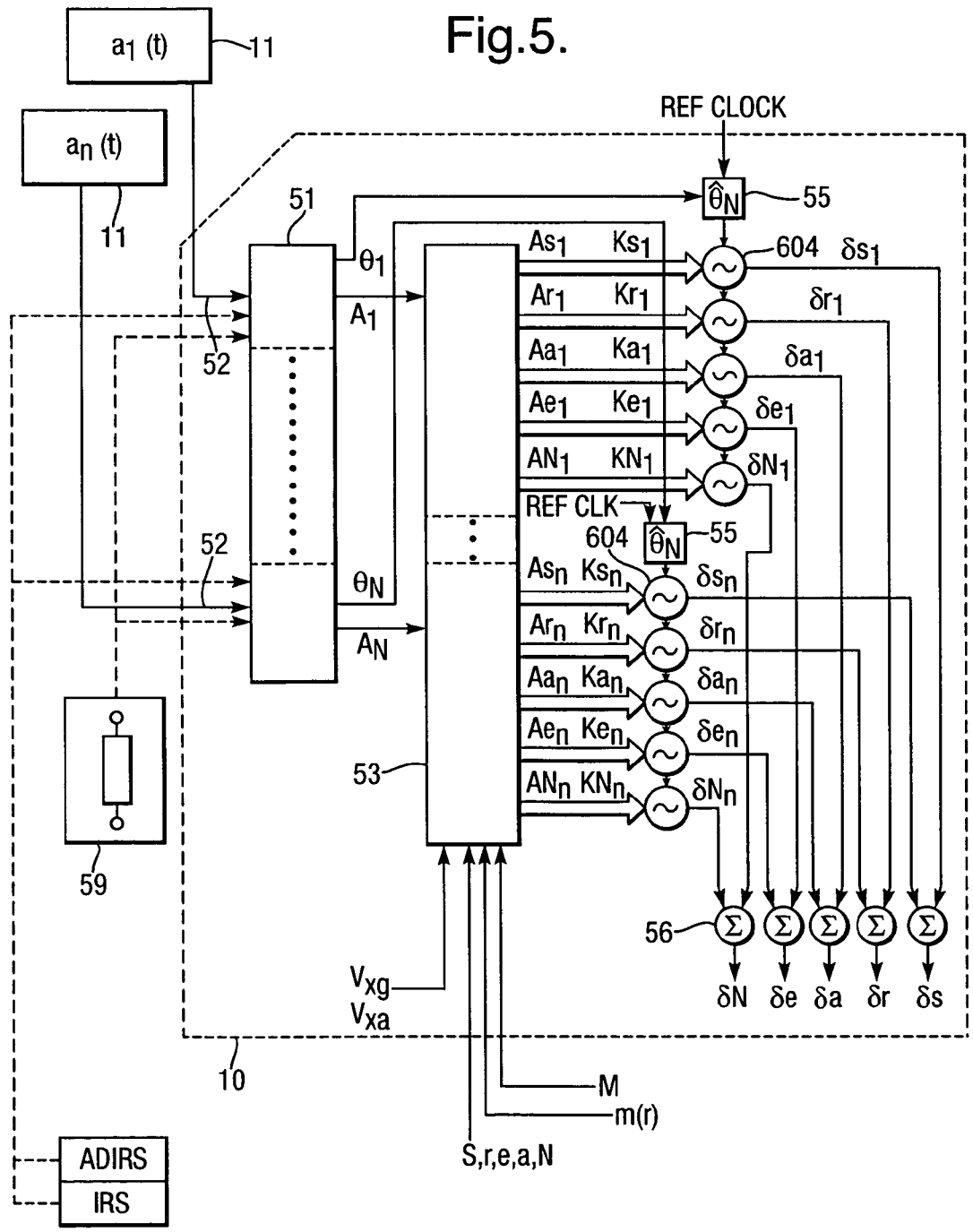
FIG. 5 shows a block diagram of first example of a mode suppression controller according to the first aspect of the invention.

FIG. 5 shows a block diagram of the second example of a mode suppression controller 10 according to the first aspect of the invention. This controller is preferably implemented as a digital signal processor (DSP) system, in which the signal processing steps (i.e. those within box 10) are calculated by a program executed by the processor. The controller takes as its input the signals from the flutter accelerometers 11 (mounted for example at positions indicated by the symbol † in FIG. 1) As noted elsewhere herein, other signals that may be used include data from the ADIRS or IRS or from strain sensors mounted on the landing gear, or indeed from a value for the vertical load on the landing gear calculated from sensors in the braking system.

In the case of a DSP solution, the signals from the flutter accelerometers are converted to digital form (if they have not been so converted prior to transmission by the accelerometers). In a first signal processing operation (shown as box 51—an amplitude an phase determiner), the controller determines the amplitude $A_i$ of excitation, and phases $\theta_i$ of, for example, the three particular modes identified above. (As noted above preferably respective tuned flutter accelerometers are provided to give separate signals for each mode, but if a configuration of flutter accelerometers is used in which at least one accelerometer is responsive to more than one of the modes this step would include separating out the modes, for example by filtering).

As will be known to those skilled in the art of signal processing, amplitude and phase can be determined by a number of methods. In an exemplary method illustrated in FIG. 6 the signal 52 from a flutter accelerometer tuned to a single mode (which signal is a sinusoid having an amplitude and phase related to the amplitude and phase of the excitation of the mode) is filtered through a notch filter 61 having a pass-band at the frequency of the mode. The amplitude $A_i$ is determined by squaring 52 the resultant sinusoid and passing that through a low pass filter 63. Phase $\theta_i$ is determined by noting 64 the positions of the zero-crossings of the sinusoid with respect to a reference clock. Many other methods are possible, for example Fourier analysis.

Referring again to FIG. 5 once the amplitude $A_i$ and phases $\theta_i$ of each mode have been determined, respective signal generators are used to generate damped sinusoids for the relevant control surfaces for each mode. In this example the form of damping is exponential decay. The amplitude A and damping factor k for each control surface is given by a lookup table 53 from the amplitude of the mode. The phase of the signals generated is controlled 55 with respect to the measured phase and the reference clock, so that the controlled surfaces counteract the excitation of the mode. In this first example the frequency of the sinusoids provided by each oscillator is fixed at the frequency of its respective mode (which varies with the aircraft mass and its distribution).

Deceleration on the runway takes 30 seconds or so (depending on the type of aircraft), but preferably the modes excited on touchdown should be suppressed within a few seconds if the invention is to be of maximum benefit; this is all the more so because the forces that can be applied with the control surfaces are proportional to the square of the speed of the aircraft. (Note that the effectiveness of the nose steering angle is not limited by dynamic pressure but will have its own limitation at low speed.) Since the frequency of the modes controlled is a few Hertz, a few seconds corresponds to a few tens of periods of oscillation. This means that amplitude, decay and phase of the oscillators can be set once to achieve the suppression. Preferably, however, the excitation of the modes is re-evaluated and oscillators are reset using new values of amplitude, damping and phase; indeed continual updating is possible. This is in fact preferred as the modes may be excited by unpredictable factors such as variation in the coefficient of friction of the runway along its length and random excitations produced by the landing gear, as explained above.

A control surface may take part in the suppression of more than one of the modes so the signals for each control surface from its various oscillators are added together 56, and are then sent to the control surfaces to actuate them. The signals generated ($\delta s$=spoilers, $\delta r$=rudder, $\delta e$=elevators $\delta a$=ailerons, $\delta N$=nose steering angle) are labelled $\delta$ because they are in this example adjustments to the commanded positions commanded by other systems such as, for example, the pilots' controls as discussed above. The table below gives the primary control surfaces used to suppress different kinds of mode.

TABLE 1

| Mode | Aircraft Controls (Control Surfaces & Nose Steering angle) used to suppress the mode |
|---|---|
| PITCH | ELEVATORS |
| ROLL | AILERONS, SPOILERS, RUDDER |
| YAW | RUDDER, SPOILERS, AILERONS |
| SHIMMY | NOSE STEERING ANGLE, RUDDER |

The force produced by a control surface will depend on the airspeed of the aircraft. Also the force on the aircraft produced by changing the nose steering angle will depend, to a certain extent, on the ground speed of the aircraft. Preferably the system takes the speed of the aircraft into account when determining the amounts by which the control surfaces (and nose steering angle) are operated to suppress the modes. In the example of FIG. 5 this is implemented by the values in the lookup table being dependent on airspeed, for the control surfaces, and ground speed, for the nose steering angle, as is represented by the aircraft speed inputs $V_{XA}$ (airspeed) and $V_{XG}$ (ground speed) to the lookup table 53.

During deceleration the pilot may well be commanding the control surfaces (and nose steering angle) to control the attitude of the aircraft and so the control surfaces (and nose wheel) may not be in their neutral positions. (FIG. 2 illustrated how the present invention is integrated with such pilot commands.) The forces produced by control surfaces and nose wheel can depend on the absolute positions of these (i.e. they may be non-linear). For example displacing the rudder by an extra 0.5° (under the control of the controller 10) may provide a larger additional force when the rudder is already at 2° than when it is at its neutral position (0°). Preferably the system takes these absolute positions into account when determining the amounts by which the surfaces (and nose steering angle) are operated to suppress the modes. In the example of FIG. 5 this is implemented by the values in the lookup table 53 being dependent on the positions of the control surfaces (and nose wheel), as is represented by the inputs s, r, a, e, N to the lookup table 53.

The mass of an aircraft is not a constant. It differs with the payload (number of passengers on board and amount of cargo) and the range (i.e. the initial fuel load). Furthermore during flight the mass reduces as the fuel is burnt. Fuel can also be pumped between tanks around the aircraft to change its trim. These different total masses and mass distributions affect the modes of the aircraft. Preferably the system takes this into account when determining the amounts by which the surfaces (and nose steering angle) are operated to suppress the modes. In the example of FIG. 5 this is implemented by the values in the lookup table being dependent on the total M and/or distribution of mass $m(\underline{r})$, as is represented by the inputs to the lookup table 53.

The total and distribution of mass also affects the frequencies of the modes. Preferably the system takes this into account (i) when analysing how much the modes are excited and/or (ii) when applying commands to suppress them. In the example of FIGS. 5 and 6 this would be implemented as follows: in the case of (i) by changing the frequency position of the cut-off of the filter used to select the signal from the flutter accelerometer, in response to the total and/or distribution of mass (values specifying that position would preferably be stored and obtained from the lookup table 53 for each mode in response to the total and/or distribution of mass, together with the other values for the mode, A and θ), and in the case of (ii) by changing the frequency of the oscillators for a mode to match that of their respective mode (values specifying that position would preferably be stored and obtained from the lookup table 53 for each mode in response to the total and/or distribution of mass, together with the other values for the mode, A and θ).

If the frequencies are dependent (e.g. for a particular aircraft) on factors other than or in addition to the mass and its distribution then that can be allowed for in the lookup table also. Generally the frequency of the mode sensed and the frequency used to control it are equal, but if they are not then both values can be stored in the lookup table 53.

The values in the lookup table 53 are predetermined. A first approximation is obtained by finite element analysis of the effects of displacements of the control surfaces (and nose steering angle)—preferably displacements of the form that will be used by the system to suppress the modes. These values can be verified and refined by experiments with an actual aircraft stationary or rolling along a runway in ground configuration. In these experiments the controller of the system is used to command the test displacements. The excitation of the modes caused by these is measured by the flutter accelerometers (which relationship is the transfer functions 13 (TF)) and those measurements are used to determine which values are used in the tables (which values represent the response 13 of the control system (see FIG. 2)). If the lookup table takes these into account the experiments can be conducted at different speeds and with the control surfaces (and nose steering angle) in different basic positions.

Potentially the lookup table 53, considering the number of input variables is large. To reduce the amount of data that needs to be stored, only representative values need be stored and intermediate values can then be determined by interpolation.

In this second example the signals fed back to the control surfaces and the nose steering angle have optionally depended on the mass of the aircraft, its distribution, the airspeed and groundspeed and the positions of the control surfaces and the nose wheel. These factors can be allowed for in the simple filter circuit of the first example by making the filter function H(s) dependent on them, as is illustrated as 29 in FIG. 2b.

In the examples above the excitation of the modes of the aircraft are measured directly using flutter accelerometers. Other kinds of sensors will also give measures of this, however, and can be used in place of the accelerometers. Their number, type and position will be determined experimentally and will differ from aircraft to aircraft.

One such alternative is to measure the load on each landing gear from the airframe above, for example, with a strain gauge mounted on one or more of the load bearing support members of the gear (i.e. the members connecting the wheels to the airframe). This load is generally in a vertical direction (although of course an individual support member may be at an angle to the vertical).

The load on a landing gear varies as its point of attachment to the airframe is displaced as the airframe flexes and the attitude of the aircraft changes. Therefore the strain gauge provides a measure of the excitation of the modes. This possibility is shown in FIG. 5 by the provision of a strain gauge 59 as alternative sensor input to the controller 10.

Clearly a strain gauge cannot be tuned to be responsive to a particular frequency, but the different modes can be identified by filtering the sensor signal with different filters 61, i.e. those shown in FIG. 6, or by a Fourier analysis (not shown as module in FIG. 5).

In general the values in lookup table 53 will be different for different kinds of sensor and so in the case of the strain gauge these can be calculated in a similar manner as for the accelerometers. Finite element analysis of the excited airframe will give values for the displacement of the point of attachment of the landing gear supports to the airframe, and these are then fed into a dynamical model of the landing gear (which comprises spring and damping elements) to calculate the additional stresses on the supports and hence the variations in strain measured by the strain gauge for each mode of interest. Again the values can be refined by experiment with the aircraft in ground configuration rolling (and stationary) along a runway, using the control surfaces to excite the modes.

The landing gears may not respond to certain ones of the modes (for example the gears might be attached at a point which is on a node of mode) and so those modes could not be controlled in this example. However these modes are by definition ones that do not cause variation in the vertical load on the landing gears and so do not cause the problematic variation in the braking force mentioned above. This sensing of the strain on the landing gear is a reasonable way of reducing such variations in braking force. If it were desired to reduce the other modes to reduce fatigue on the airframe then the accelerometers would be preferable to that extent.

In general sensors other than those described above could be used to sense the excitation of the modes.

As briefly mentioned above, sensors do not always provide signals of the same frequency as their exciting phenomena, for example, sometimes the signal produced can be at harmonics or sub-harmonics of the excitation. In such a case the frequency used to pre-process the sensor signal (e.g. the frequency of a filter used to separate out the signal caused by a mode) will be different from that produced by an oscillator of the controller to control the mode.

In other cases sensors might measure amplitude and phase directly of a mode, removing the need to obtain these values from the sensor output signals by signal processing, as was undertaken in the example given above.

The invention claimed is:

1. An aircraft control system comprising
   one or more sensors responsive to one or more of the modes of the aircraft, and
   a controller responsive to the one or more sensors to provide, during braking of the aircraft on the ground, one or more control signals for one or more of (a) the control surfaces of the aircraft and (b) the steering angle of a ground wheel of the aircraft,
   the control signals provided by the controller being such that they reduce the variation in vertical load on the ground wheels of the aircraft caused by excitation of the said one or more modes of the aircraft.

2. An aircraft control system as claimed in claim 1 in which the or a mode controlled by the controller is a normal mode of flexing of the aircraft.

3. An aircraft control system as claimed in claim 2 wherein the mode controlled is a normal mode in which the fuselage undergoes lateral bending when viewed from above.

4. An aircraft control system as claimed in claim 2 wherein the or a mode controlled by the controller is a symmetric normal mode of pitch.

5. An aircraft control system as claimed in claim 2 wherein the or a mode controlled by the controller is an anti-symmetric normal mode of roll.

6. An aircraft control system as claimed in claim 2 wherein the or a mode controlled by the controller is an anti-symmetric normal mode of yaw.

7. An aircraft control system as claimed in claim 1 in which a mode controlled by the controller is an oscillatory mode of rigid rotation of the aircraft.

8. An aircraft control system as claimed in claim 1 wherein the one or more sensors is, or includes, an accelerometer.

9. An aircraft control system as claimed in claim 8 wherein the accelerometer is a flutter accelerometer.

10. An aircraft control system as claimed in claim 9 wherein the flutter accelerometer is tuned to a mode of the aircraft that is controlled by the controller.

11. An aircraft control system as claimed in claim 1 wherein the one or more sensors is, or includes, a strain-measuring device mounted on the aircraft so as to measure the vertical load on a landing gear or landing wheel.

12. An aircraft control system as claimed in claim 1 wherein the one or more sensors is, or includes the air data inertial reference system (ADIRS) or the inertial reference system (IRS).

13. An aircraft control system as claimed in claim 1 wherein the one or more sensors is, or includes the sensors of the braking system of the landing gear providing a measure of the vertical load on a landing gear.

14. An aircraft control system as claimed in claim 1 wherein the controller comprises a filter connected to filter the signals from the sensors and to provide those as the control signals.

15. An aircraft control system as claimed in claim 14 wherein the response function of the filter is dependent on one or more of the following: the mass of the aircraft, the distribution of the mass of the aircraft, the airspeed of the aircraft, the ground speed of the aircraft, the position of one or more of the flight control surfaces.

16. An aircraft control system as claimed in claim 1 comprising, in respect of a mode that the controller controls, a filter connected to be responsive to signals from a said sensor that senses that mode, to pick out from those signals the signal at the frequency produced by the sensor in response to that mode.

17. An aircraft control system as claimed in claim 1 wherein the controller is arranged to determine, in response to the signals from the one or more sensors, the amplitude and phase of a said mode, and in response to that amplitude and phase to generate the or a said control signal.

18. An aircraft control system as claimed in claim 17 wherein controller comprises one or more oscillators connected to generate the control signal.

19. An aircraft control system as claimed in claim 1 comprising an adder connected to add commands from the pilot for the flight control surfaces and/or the nose steering angle to the control signal from the controller, the resultant being applied to the flight control surfaces and/or the nose wheel.

20. An aircraft comprising:
   control surfaces and ground wheels,
   one or more sensors responsive to one or more of the modes of the aircraft, and
   a controller responsive to the one or more sensors to provide, during braking of the aircraft on the ground, one or more control signals for one or more of (a) the control surfaces of the aircraft and (b) the steering angle of a ground wheel of the aircraft,
   the control signals provided by the controller being such that they reduce the variation in vertical load on the ground wheels of the aircraft caused by excitation of the said one or more modes of the aircraft.

* * * * *